3,462,464
2-OXIMINO-3-KETO STEROIDS OF THE
ANDROSTANE SERIES
Ralph F. Hirschmann, Scotch Plains, and Helmut Mrozik, Matawan, N.J., assignors to Merck & Co., Inc., Rahway, N.J., a corporation of New Jersey
No Drawing. Filed June 28, 1963, Ser. No. 291,308
Int. Cl. C07c 169/10, 169/22
U.S. Cl. 260—397.4    14 Claims

ABSTRACT OF THE DISCLOSURE

The invention disclosed herein is concerned generally with novel steroid compounds and processes for preparing them. More particularly, it relates to novel 2-oximino-3-keto-17-oxygenated steroids of the androstane series having an anabolic activity, and with processes of preparing these new compounds by reacting the corresponding 2-hydroxyalkylidine-3-keto-17-oxygenated steroids with nitrous acid. These 2-oximino-3-keto-17-oxygenated steroids, and in particular 2-oximino-17$\beta$-hydroxy androsta-3-one and 2-oximino-17$\beta$-hydroxy-17$\alpha$-methyl androsta-3-one, are valuable as anabolic agents. Moreover, the ratio of anabolic to androgen activity in these 2-oximino-3-keto-17-oxygenated steroid compounds is equal to or greater than that of the corresponding 2-hydroxy-methylene-3-keto steroids.

---

These novel 2-oximino-3-keto-17-oxygenated steroids of the androstane series may be chemically represented as follows:

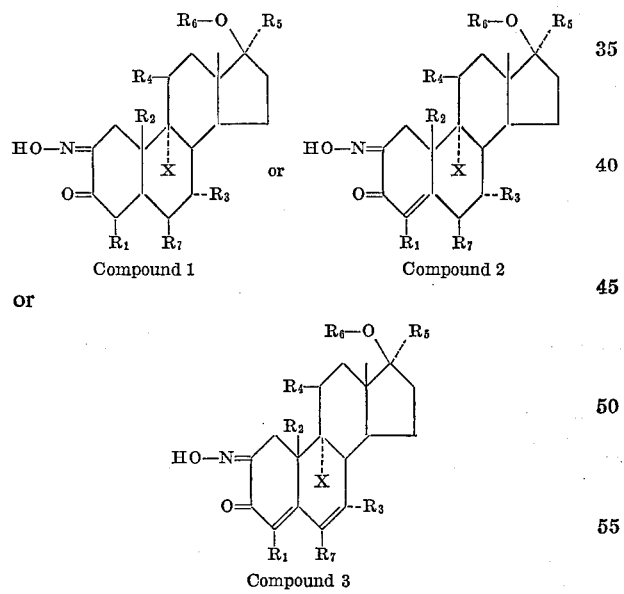

Compound 1   Compound 2 or

Compound 3 wherein $R_1$ is hydrogen, hydroxyl or halogen, but halogen or hydroxyl is only present at $R_1$ when there is a double bond at $\Delta^4$; $R_2$ is hydrogen or methyl; $R_3$ is hydrogen or alkyl; $R_4$ is hydrogen, keto or $\beta$-hydroxyl; $R_5$ is hydrogen, alkyl, alkenyl, $\omega$-haloalkynyl or alkynyl; $R_6$ is hydrogen, aralkanoyl or alkanoyl; $R_7$ is hydrogen, alkyl or halogen, but halogen is only present at $R_7$ when there is a double bond at $\Delta^6$; and X is hydrogen or halogen.

These novel 2-oximino-3-keto-17-oxygenated steroids of the androstane series may be prepared by reacting the corresponding 2-hydroxyalkylidine-3-keto-17-oxygenated steroid such as 2-hydroxymethylene-17$\beta$-hydroxy-17$\alpha$-methyl androsta-3-one (Compound 4 hereinbelow) and 2-hydroxymethylene-4-chloro-11$\beta$,17$\beta$-dihydroxy-7$\alpha$,17$\alpha$-dimethyl-19-nor-androsta-4-ene-3-one (Compound 5 hereinbelow) and 2-hydroxymethylene-6,9$\alpha$-difluoro-17$\beta$-hydroxy - androst - 4,6 - diene-3-one-17$\beta$-(3-cyclopentanopropionate) (Compound 6 hereinbelow) with approximately one equivalent of nitrous acid thereby forming the corresponding 2-oximino-17$\beta$-hydroxy-17$\alpha$-methyl-androsta-3-one (Compound 7 hereinbelow), 2-oximino-4-chloro-11$\beta$, 17$\beta$-dihydroxy-7$\alpha$,17$\alpha$-dimethyl androst-4-ene-3-one (Compound 8 hereinbelow), 2-oximino-6,9$\alpha$-difluoro - 17$\beta$ - hydroxy-androst - 4,6 - diene-3-one-17$\beta$-(3-cyclopentanopropionate) (Compound 9 hereinbelow).

The reactions indicated hereinabove may be chemically represented as follows:

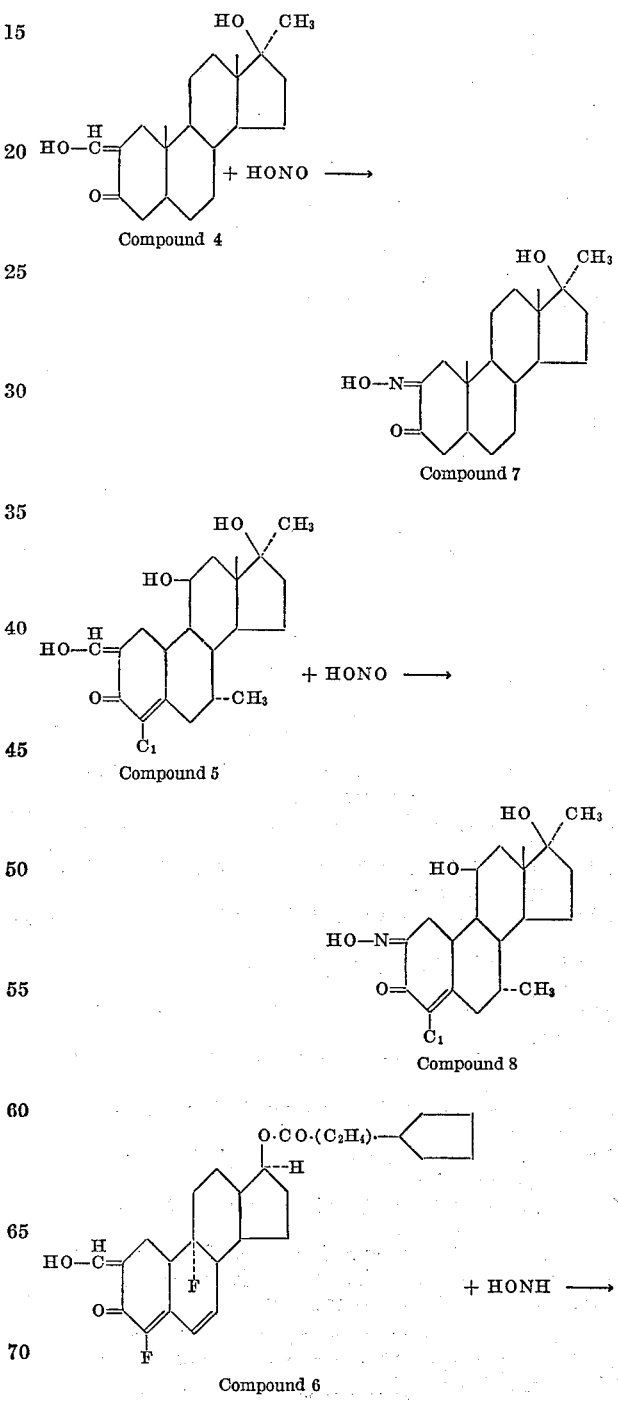

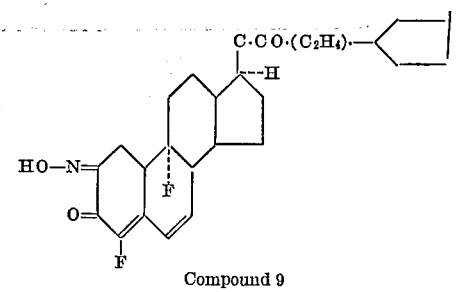

Compound 9

The intermediate 2-hydroxyalkylidine-3-keto steroids are prepared by condensing a 3-keto steroid, a 3-keto-$\Delta^4$-steroid or a 3-keto-$\Delta^{4,6}$-steroid with an alkanoylating agent, e.g., a lower alkyl-lower alkanoate such as ethyl formate or methyl formate, under anhydrous conditions in the presence of a strong base, e.g., an alkali metal lower alkoxide such as sodium ethoxide, an alkali metal amide such as potassium amide, an alkali metal hydride such as sodium hydride, and the like.

In a preferred modification of the invention, the steroid is dissolved in a solvent such as benzene and the resulting solution is cooled to room temperature and treated with ethyl formate. The air in the system is replaced with nitrogen, sodium hydride is added and the mixture stirred at room temperature for several hours.

In the above reaction, when starting with a steroid having either an 11$\beta$-hydroxy group or a 17$\beta$-hydroxy group, or both together, an 11$\beta$-formate or a 17$\beta$-formate, or an 11$\beta$,17$\beta$-diformate may be formed.

The 2-hydroxymethylene-3-keto-17-oxygenated steroids of the androstane series utilized as starting materials in the presently invented process include 2-hydroxymethylene-17$\beta$-hydroxy-androsta-3-one,
2-hydroxymethylene-17$\beta$-hydroxy-androsta-3-one-17$\beta$-acetate,
2-hydroxymethylene-17$\beta$-hydroxy-androsta-3-one-17$\beta$-(3-cyclopentanyl propionate),
2-hydroxymethylene-17$\beta$-hydroxy-androsta-3-one-17$\beta$-(4-chlorophenoxyacetate),
2-hydroxymethylene-17$\beta$-hydroxy-17$\alpha$-methyl-androsta-3-one, and
2-hydroxymethyl-17$\alpha$-ethynyl-17$\beta$-hydroxy-androsta-3-one,
2-hydroxymethyl-6$\alpha$,17$\alpha$-dimethyl-17$\beta$-hydroxy-androsta-3-one,
2-hydroxymethyl-17$\beta$-hydroxy-17$\alpha$-vinyl-androsta-3-one,
2-hydroxymethyl-17$\beta$-hydroxy-androst-4-ene-3-one,
2-hydroxymethyl-17$\beta$-hydroxy-androst-4-ene-3-one-17$\beta$-propionate,
2-hydroxymethyl-17$\beta$-hydroxyl-androst-4-ene-3-one-17$\beta$-(3-cyclohexylpropionate),
2-hydroxymethyl-17$\beta$-hydroxyl-17$\alpha$-methyl-androst-4-ene-3-one,
2-hydroxymethyl-17$\beta$-hydroxyl-17$\alpha$-vinyl-androst-4-ene-3-one,
2-hydroxymethyl-17$\alpha$-ethynyl-17$\beta$-hydroxyl-androst-4-ene-3-one,
2-hydroxymethyl-17$\beta$-hydroxyl-6$\alpha$-methyl-17$\alpha$-propynyl-androst-4-ene-3-one,
2-hydroxymethyl-11$\beta$,17$\beta$-dihydroxy-9$\alpha$-fluoro-17$\alpha$-methyl-androst-4-ene-3-one,
2-hydroxymethyl-9$\alpha$-fluoro-17$\beta$-hydroxyl-17$\alpha$-methyl-androst-4-ene-dione,
2-hydroxymethyl-17$\beta$-hydroxyl-17$\alpha$-methyl-19-nor-androst-4-ene-3-one.

Other 3-keto-17-oxygenated steroids of the androstane series which may be utilized as starting materials in the presently invented process include:

7$\alpha$,17$\alpha$-dimethyl-17$\beta$-hydroxy-androst-4-ene-3-one,
11$\beta$,17$\beta$-dihydroxy-7$\alpha$,17$\alpha$-dimethyl-androst-4-ene-3-one,
17$\beta$-hydroxy-7$\alpha$-methyl-19-nor-androst-4-ene-3-one-17$\beta$-acetate,
17$\beta$-hydroxy-7$\alpha$-methyl-19-nor-androst-4-ene-3-one.
7$\alpha$,17$\alpha$-dimethyl-17$\beta$-hydroxy-19-nor-androst-4-ene-3-one,
17$\alpha$-ethynyl-17$\beta$-hydroxy-7$\alpha$-methyl-19-nor-androst-4-ene-3-one,
4-chloro-17$\beta$-hydroxy-androst-4-ene-3-one,
4-chloro-17$\beta$-hydroxy-6$\alpha$-methyl-androst-4-ene-3-one,
11$\beta$,17$\beta$-dihydroxy-17$\alpha$-methyl-androst-4,6-diene,
7$\alpha$-methyl-17$\beta$-hydroxy-androst-4,6-diene,
6-chloro-17$\beta$-hydroxy-androst-4,6-diene,
11$\beta$,17$\beta$-dihydroxy-9$\alpha$-fluoro-17-methyl-androst-4-ene-3-one,
17$\beta$-hydroxy-androst-4-ene-3-one,
17$\beta$-hydroxy-androst-4,9(11)-diene.

The reaction between the 2-hydroxymethylene 3-keto-17-oxygenated steroids of the androstane series and nitrous acid is conducted by bringing approximately equimolecular equivalents of the reactants together in aqueous solution in an inert atmosphere such as nitrogen, helium or argon. The 2-hydroxymethylene-3-keto-17-oxygenated steroid is dissolved in a mixture of an organic solvent, as for example, a lower halogenated hydrocarbon such as methylene chloride, chloroform, dichloro ethane or trichloro ethane, and an organic acid, as for example a lower alkanoic acid such as formic acid, acetic acid or propionic acid and a small amount of water. The solution of the steroid is cooled in an ice bath and a solution of metal nitrite for example an alkali metal nitrite such as sodium or patassium nitrite in water, added thereto. The mixture of the 2-hydroxy methylene 3-keto-17-oxygenated steroid and the alkali metal nitrite are stirred at ice bath temperature for ½–6 hours thereby forming the corresponding 2-oximino-3-keto - 17 - oxygenated steroid. The 2-oximino-3-keto-17-oxygenated steroid is conveniently recovered by diluting the reaction mixture with ice water and extracting the resulting aqueous mixture with a halogenated hydrocarbon such as methylene chloride. The halogenated hydrocarbon extract is washed free of acidic impurities, dried, and evaporated to dryness. The resulting residual material is recrystallized from an organic solvent such as ethyl acetate, ethyl acetate ether, and the like; to give in substantially pure form the corresponding 2-oximino-3-keto-17-oxygenated steroid of the androgen series as for example:

2-oximino-17$\beta$-hydroxy-androsta-3-one,
2-oximino-17$\beta$-hydroxy-androsta-3-one-17$\beta$-acetate,
2-oximino-17$\beta$-hydroxy-androsta-3-one-17$\beta$-(3-cyclopentanyl propionate),
2-oximino-17$\beta$-hydroxy-androsta-3-one-17$\beta$-(4-chlorophenoxyacetate),
2-oximino-17$\beta$-hydroxy-17$\alpha$-methyl-androsta-3-one, and
2-oximino-17$\alpha$-ethynyl-17$\beta$-hydroxy-androsta-3-one,
2-oximino-6$\alpha$,17$\alpha$-dimethyl-17$\beta$-hydroxy-androsta-3-one,
2-oximino-17$\beta$-hydroxy-17$\alpha$-vinyl-androsta-3-one,
2-oximino-17$\beta$-hydroxyl-androst-4-ene-3one,
2-oximino-17$\beta$-hydroxyl-androst-4-ene-3-one-17$\beta$-propionate,
2-oximino-17$\beta$-hydroxyl-androst-4-ene-3-one-17$\beta$-(3-cyclohexylpropionate),
2-oximino-17$\beta$-hydroxyl-17$\alpha$-methyl-androst-4-ene-3-one,
2-oximino-17$\beta$-hydroxyl-17$\alpha$-vinyl-androst-4-ene-3-one,
2-oximino-17$\alpha$-ethynyl-17$\beta$-hydroxylandrost-4-ene-3-one,
2-oximino-17$\beta$-hydroxyl-6$\alpha$-methyl-17$\alpha$-propynyl-androst-4-ene-3-one,
2-oximino-11$\beta$,17$\beta$-dihydroxyl-9$\alpha$-fluoro-17$\alpha$-methyl-androst-4-ene-3-one,
2-oximino-9$\alpha$-fluoro-17$\beta$-hydroxyl-17$\alpha$-methyl-androst-4-ene-dione,
2-oximino-17$\beta$-hydroxyl-17$\alpha$-methyl-19-nor-androst-4-ene-3-one,
2-oximino-7$\alpha$,17$\alpha$-dimethyl-17$\beta$-hydroxy-androst-4-ene-3-one,
2-oximino-11$\beta$,17$\beta$-dihydroxy-7$\alpha$,17$\alpha$-dimethyl-androst-4-ene-3-one, 2-oximino-17β-hydroxy-7α-methyl-19-nor-androst-4-ene-3-one-17β-acetate,
2-oximino-17β-hydroxy-7α-methyl-19-nor-androst-4-ene-3-one,
2-oximino-7α,17α-dimethyl-17β-hydroxy-19-nor-androst-4-ene-3-one,
2-oximino-17α-ethynyl-17β-hydroxy-7α-methyl-19-nor-androst-4-ene-3-one,
2-oximino-4-chloro-17β-hydroxy-androst-4-ene-3-one,
2-oximino-4-chloro-6α-methyl-17β-hydroxy-androst-4-ene-3-one,
2-oximino-11β,17β-dihydroxy-17α-methyl-androst-4,6-diene,
2-oximino-17β-hydroxy-7α-methyl-androst-4,6-diene,
2-oximino-6-chloro-17β-hydroxy-androst-4,6-diene,
2-oximino-11β,17β-dihydroxy-9α-fluoro-17α-methyl-androsta-3-one,
2-oximino-7α,17-dimethyl-17β-hydroxy-androsta-3-one,
11β,17β-dihydroxy-7α,17α-dimethyl-androsta-3-one,
2-oximino-6-bromo-17β-hydroxy-androst-4-ene-3-one,
2-oximino-6-chloro-11β,17β-dihydroxy-9α-fluoro-androst-4-ene-3-one,
2-oximino-6-chloro-9α-fluoro-17β-hydroxy-androst-4-ene-3,11-dione,
2-oximino-11β,17β-dihydroxy-7α,17α-dimethyl-androst-4-ene-3-one,
2-oximino-7α,17α-dimethyl-17β-hydroxy-androst-4-ene-3,11-dione and the like.

The following examples illustrate methods of carrying out the present invention, but it is to be understood that these examples are given for purposes of illustration and not of limitation.

EXAMPLE 1

250 mg. of 2-hydroxymethylene - 17β - hydroxy - 17α-methyl-19-nor androstane (allodihydrotestosterone)-3-one in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethyl acetate to give substantially pure 2-oximino-17β-hydroxy-17α-methyl-19-nor-androsta-3-one.

In accordance with the above procedure but starting with 2-hydroxyalkylidene-17β-hydroxy-17α-methyl-androst-4-ene-3-one,
2-hydroxyalkylidine-17β-hydroxy-17α-methylandrosta-3-one,
2-hydroxyalkylidine-11β,17β-dihydroxy-9α-fluoro-17α-hydroxy-androst-4-ene-3-one,
2-hydroxy-alkylidine-17α-ethyl-17β-hydroxy-19-nor-androst-4-ene-3-one,
2-hydroxyalkylidine-17α-ethyl-17β-hydroxy-androsta-3-one,
2-hydroxyalkylidine-17β-hydroxy-androsta-3-one-17β-acetate, and
2-hydroxyalkylidine-17α-ethynyl-17β-hydroxy-19-nor-androst-4-ene-3-one there is obtained
2-oximino-17β-hydroxy-17α-methyl-androst-4-ene-3-one,
2-oximino-17β-hydroxy-17α-methyl-androsta-3-one,
2-oximino-11β,17β-dihydroxy-9α-fluoro-17α-hydroxy-androsta-4-ene-3-one,
2-oximino-17α-ethyl-17β-hydroxy-19-nor-androst-4-ene-3-one,
2-oximino-17α-ethyl-17β-hydroxy-androsta-3-one,
2-oximino-17β-hydroxy-androsta-3-one-17β-acetate, and
2-oximino-17α-ethynyl-17β-hydroxy-19-nor-androst-4-ene-3-one, respectively.

EXAMPLE 2

1.6 grams of cuprous chloride followed by 9.3 gms. of 17β - hydroxy-17α-methyl-19-nor-androst-4,6-diene-3-one are added to a solution of 100 ml. of 3 M ethereal methyl magnesium bromide in 200 ml. of tetrahydrofuran at ice bath temperature and in an atmosphere of nitrogen. A small amount of cuprous chloride in 130 ml. of tetrahydrofuran is then added. The cooling bath is removed and the mixture stirred for 25 minutes and poured into a mixture of ether, ice and dilute aqueous hydrochloric acid which is saturated with sodium chloride. The ether extract is washed with dilute aqueous hydrochloric acid saturated with sodium chloride, saturated aqueous sodium chloride solution, dilute sodium hydroxide saturated with sodium chloride and again with a saturated aqueous sodium chloride solution. Each aqueous phase is back extracted with ether. The combined ether extracts are dried and evaporated to dryness. The residue is chromatographed through a column of magnesium silica gel (as, for example, the product sold by The Floridin Company, Tallahassee, Fla., under the trademark name Florisil). The 7α,17α - dimethyl-and 7β,17α-dimethyl-17β-hydroxy-19-nor-androst-4-ene-3-ones are eluted together on elution with a mixture of 7 parts of acetone and 93 parts of petroleum ether. The eluate is evaporated and treated with 2.8 g. of chloroanil in t-butylalcohol and heated under reflux for 2 hours. The solution is evaporated under reduced pressure and extracted with methylene chloride.

The solution was filtered through 500 g. of magnesium silica gel (as, for example, the product sold by The Floridin Company, Tallahassee, Fla., under the trademark name Florisil) and washed two times with dilute aqueous sodium hydroxide solution and two times with water. The methyline chloride solution was evaporated and chromatographed on magnesium silica gel (as, for example, the product sold by The Floridin Company, Tallahassee, Fla., under the trade-mark name Florisil). Elution with a mixture of 1 part of acetone and 19 parts of petroleum ether gave 7α,17α-dimethyl-17β-hydroxy-19-nor-androst-4-ene-3-one which was purified by recrystallization from acetone.

3.1 grams of 7α,17α - dimethyl-17β-hydroxy-19-nor-androst-4-ene-3-one is dissolved in 35 ml. of methanol and 200–500 ml. of benzene on a steam bath. The steroid is hydrogenated at room temperature using as catalyst 4.5 g. of 5% Pd/BaSO4 and 30 pounds pressure for about 2 hours. The product is filtered and washed three times with a hot mixture of benzene and methanol. The filtrates and washes are concentrated under vacuum on a steam bath. The residue is flushed two times with acetone. The residue is dissolved in 200 ml. of acetone and then concentrated to 25 ml. After standing overnight at 5° C. there is obtained 7α,17α - dimethyl-17β-hydroxy-19-nor-androst-3-one.

A suspension of 1.4 g. of 7α,17α-dimethyl-17β-hydroxy-19-nor-androst-3-one in 250 ml. of dry benzene is stirred in a nitrogen atmosphere with 5 ml. of ethyl formate and 2.3 g. of a suspension of about 54% sodium hydride in mineral oil at room temperature for 100 hours. Then an additional 5 ml. of ethyl formate and 1.75 g. of sodium hydride is added. After 10 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-7α,17α-dimethyl- 17β-hydroxy-19-nor-androst-3-one, and/or formate esters thereof.

238 mg. of 2-hydroxymethylene-7α,17α-dimethyl-17β-hydroxy-19-nor-androst-3-one in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three time with methylene chloride. The methylene chloride extract is washed with water and saturated aqueous sodium chloride solution, dried, and evaporated to dryness. The residual material is crystallized from ethyl acetate to give substantially pure 2-oximino - 7α,17α - dimethyl-17β-hydroxy-19-nor-androst-3-one.

In accordance with the above procedure but starting with 17α - methyl - 17β - hydroxy-androst-4,6-diene-3-one, there is obtained 2-oximino-7α,17α-dimethyl-17β-hydroxy-androst-3-one.

EXAMPLE 3

1.6 grams of cuprous chloride followed by 0.8 gms. of 17β - hydroxy - 17α - ethyl - 19 - nor - androst - 4,6 - diene-3-one are added to a solution of 100 ml. of 3 M ethereal methyl magnesium bromide in 200 ml. of tetrahydrofuran at ice bath temperature and in an atmosphere of nitrogen. A small amount of cuprous chloride in 130 ml. of tetrahydrofuran is then added. The cooling bath is removed and the mixture stirred for 25 minutes and poured into a mixture of ether, ice and dilute aqueous hydrochloric acid which is saturated with sodium chloride. The ether extract is washed with dilute aqueous hydrochloric acid saturated with sodium chloride, saturated aqueous sodium chloride solution, dilute sodium hydroxide saturated with sodium chloride and again with a saturated aqueous sodium chloride solution. Each aqueous phase is back extracted with ether. The combined ether extracts are dried and evaporated to dryness. The residue is chromatographed through a column of magnesium silica gel (as, for example, the product sold by The Floridin Company, Tallahassee, Fla., under the trade-mark name Florisil). The 17α-methyl-7α-methyl and 17α - ethyl - 7β - methyl - 17β - hydroxy - 19 - nor-androst - 4 - ene - 3 - ones are eluted together on elution with a mixture of 7 parts of acetone and 93 parts of petroleum ether. The eluate is evaporated and treated with 2.8 g. of chloranil in t-butylalcohol and heated under reflux for 2 hours. The solution is evaporated under reduced pressure and extracted with methylene chloride.

A suspension of 1.93 g. of 17α-ethyl-7α-methyl-19-nor-androst-4-ene-3-one in 250 ml. of dry benzene is stirred in a nitrogen atmosphere with 5 ml. of ethyl formate and 2.3 mg. of a suspension of about 54% sodium hydride in mineral oil at room temperature for 100 hours. Then an additional 5 ml. of ethyl formate and 1.75 g. of sodium hydride is added. After 10 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-17α - ethyl - 7α - methyl - 19 - nor - androst - 4 - ene - 3-one, and/or formate esters thereof.

2.48 mg. of 2-hydroxymethylene-17α-ethyl-7α-methyl-19 - nor - androst - 4 - ene - 3 - one in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethlyl acetate to give substantially pure 2 - oximino - 2 - hydroxymethylene - 17α-methyl-19-nor-androst-4-ene-3-one.

In accordance with the above procedure but starting with 17β - hydroxy - androst - 4,6 - diene - 3 one there is obtained 2 - oximino - 17β - hydroxy - 7α - methyl-androst-4-ene-3-one.

A suspension of 2.54 g. of 17β-hydroxy-androst-4-ene-3-one-17β-phenyl-propionate in 250 ml. of dry benzene is stirred in a nitrogen atmosphere with 5 ml. of ethyl formate and 2.3 g. of a suspension of about 54% sodium hydride in mineral oil at room temperature for 100 hours. Then an additional 5 ml. of ethyl formate and 1.75 g. of sodium hydride is added. After 10 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-17β-hydroxy - androst - 4 - ene - 3 - one - 17β - phenyl propionate, and/or formate esters thereof.

334 mg. of 2-hydroxymethylene-17β-hydroxy-androst-4-ene-3-one-17β-phenyl-propionate in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethyl acetate to give substantially pure 2 - oximino - 2 - hydroxymethylene - 17β-hydroxy-androst-4-ene-3-one-17-phenyl-propionate.

In accordance with the above procedure but starting with 17β - hydroxy - androsta - 3 - one - 17β - acetate there is obtained 2 - oximino - 17β - hydroxy - androsta-3-one-17β-acetate.

EXAMPLE 4

4.3 grams of 17β - hydroxy - androst - 4-ene-3-one-17β-phenyl-propionate is dissolved in 35 ml. of methanol and 200–500 ml. of benzene on a steam bath. The steroid is hydrogenated at room temperature using as catalyst 4.5 g. of 5% Pd/BaSO4 and 30 pounds pressure for about 2 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing overnight at 5° C. there is obtained 17β-hydroxy-androst-3-one-17β-phenyl-propionate.

A suspension of 2.54 g. of 17β-hydroxy-androst-3-one-17β-phenyl-propionate in 250 ml. of dry benzene is stirred in a nitrogen atmosphere with 5 ml. of ethyl formate and 2.3 g. of a suspension of about 54% sodium hydride in mineral oil at room temperature for 100 hours. Then an additional 5 ml. of ethyl formate and 1.25 g. of sodium hydride is added. After 10 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-17β-hydroxy-androst-3-one-17β-phenyl-propionate, and/or formate esters thereof.

334 mg. of 2-hydroxymethylene-17β-hydroxy-androst-3-one-17β-phenyl-priopionate in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethyl acetate to give susbtantially pure 2 - oximino - 17β - hydroxy - androst - 3 - one - 17β-phenyl-propionate.

960 mg. of 17α-methyl-17β-hydroxy-androst-4-ene-3-one is dissolved in 66 ml. of methanol and 2 ml. of 4 N aqueous sodium hydroxide solution and 3.4 ml. of 34% aqueous peroxide solution are added with stirring and the mixture held at ice bath temperature for two hours. The solution is then made acid with 2.2 ml. of glacial acetic acid, poured into 300 ml. of water, heated for 15 minutes at 90° and left overnight in an icebox. The precipitate is filtered, washed with water and crystallized from methanol to give 4β,5-epoxy-17β-hydroxy-17α-methyl-androst-4-ene-3-one.

475 mg. of 4β,5 - epoxy - 17β - hydroxy - 17α-methyl-androst-4-ene-3-one are dissolved in 3 ml. of glacial acetic acid and stirred with 0.3 ml. or concentrated sulfuric acid for 16 hours at room temperature. The solution is then poured into ice water, extracted with benzene, the extract is washed with water and evaporated. The residue is recrystallized from methanol to give 4,17-dihydroxy-17α-methyl-androst-4-ene-3-one.

A suspension of 388 mg. of 17α-methyl-14,17β-dihydroxy-androst-4-ene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After 2 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-17α - methyl - 4,17β - dihydroxy - androst-4-ene-3-one-4-formate, and/or formate esters thereof.

297 mg. of 2-hydroxymethylene-17α-methyl-4,17β-dihydroxy-androst-4-ene-3-one-4-formate in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethyl acetate to give substantially pure 2 - oximino - 17α - methyl - 4,17β - dihydroxy-androst-4-ene-3-one-4-formate. The 4-formate may be converted to the corresponding dihydroxy steroid by known methods of hydrolysis in a basic medium.

In accordance with the above procedure, but starting with 17α-methyl-17β-hydroxy-19-nor-androst-4-ene-3-one, there is obtained 2-oximino-17α-methyl-4,17β-dihydroxy-19-nor-androst-4-en-3-one.

960 mg. of 17β-hydroxy-17α-methyl-androst-4-ene-3-one is dissolved in 66 ml. of methanol and 2 ml. of 4 N aqueous sodium hydroxide solution and 3.4 ml. of 34% aqueous hydrogen peroxide solution are added with stirring and the mixture held at ice bath temperature for two hours. The solution is then made acid with 2.2 ml. of glacial acetic acid, poured into 300 ml. of water, heated for 15 minutes at 90° and left overnight in an icebox. The precipitate is filtered, washed with water and crystallized from methanol to give 4β,5-epoxy-17β-hydroxy-17α-methyl-androst-4-ene-3-one.

4.75 mg. of 4β,5-epoxy-17β-hydroxy-17α-methyl-androst-4-ene-3-one are dissolved in 2.5 ml. of glacial acetic acid and stirred with 0.5 ml. of glacial acetic acid saturated with anhydrous hydrochloric acid gas for 30 minutes at room temperature. The precipitate is filtered, washed with ether and dried and recrystallized from methanol to give 4-chloro-17β-hydroxy-17α-methyl-androst-4-ene-3-one.

A suspension of 426 mg. of 4-chloro-17α-methyl-17β-hydroxy-androst-4-ene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After 2 hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 2-hydroxymethylene-4-chloro-17α-methyl-17β-hydroxy-androst-4-ene - 3 - one, and/or formate esters thereof.

301 mg. of 2-hydroxymethylene-4-chloro-17α-methyl-17β-hydroxy-androst-4-ene-3-one in 3 ml. of methylene chloride and 15 ml. of glacial acetic acid and 1 ml. of water are cooled to 2° in an atmosphere of nitrogen. The mixture is stirred and 60 mg. of sodium nitrite dissolved in 3 ml. of water is added dropwise thereto, the temperature being held at 2°. The resulting mixture is allowed to stand for 20 minutes at 0°. The reaction solution is then diluted with 30 ml. of ice cold water and the aqueous mixture thus obtained extracted three times with methylene chloride. The methylene chloride extract is washed with water and saturated aqueous sodium chloride solution, dried, and evaporated to dryness. The residual material is crystallized from ethyl acetate to give substantially pure 2-oximino-4-chloro-17α-methyl-17β-hydroxy-androst-4-ene-3-one.

In accordance with the above procedure but starting with 17α - methyl-17β-hydroxy-19-nor-androst-4-ene-3-one, there is obtained 2-oximino-4-chloro-17α-methyl-17β-hydroxy-19-nor-androst-4-ene-3-one.

Various changes and modifications may be made in carrying out the present invention without departing from the spirit and scope thereof. Insofar as these changes and modifications are within the purview of the annexed claims, they are to be considered as part of our invention.

What is claimed is:

1. A compound selected from the group consisting of $\Delta^4$ and $\Delta^{4,6}$ analogues of compounds having the structural formula

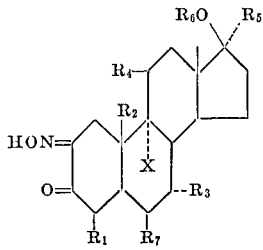

wherein $R_1$ is hydrogen, hydroxyl or chloro; $R_2$ is hydrogen or methyl; $R_3$ is hydrogen or lower alkyl; $R_4$ is hydrogen, keto or β-hydroxyl; $R_5$ is hydrogen, lower alkyl, lower alkenyl, chloroethynyl or lower alkynyl; $R_6$ is hydrogen, lower aralkanoyl or lower alkanoyl; $R_7$ is hydrogen, lower alkyl, bromo or chloro, but bromo or chloro are present at $R_7$ only when there is a double bond at $\Delta^6$; and X is hydrogen or fluoro.

2. The process which comprises reacting a compound selected from the group consisting of $\Delta^4$ and $\Delta^{4,6}$ analogues of compounds having the following structure

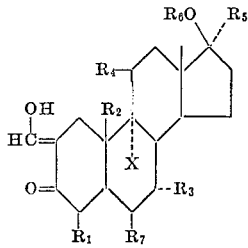

wherein $R_1$ is hydrogen, hydroxyl or chloro; $R_2$ is hydrogen or methyl; $R_3$ is hydrogen or lower alkyl; $R_4$ is hydrogen, keto or β-hydroxyl; $R_5$ is hydrogen, lower alkyl, lower alkenyl, chloroethynyl or lower alkynyl; $R_6$ is hydrogen, lower aralkanoyl or lower alkanoyl; $R_7$ is hydrogen, lower alkyl, bromo or chloro, but bromo or chloro are present at $R_7$ only when there is double bond at $\Delta^6$; and X is hydrogen or fluoro; with nitrous acid in an inert atmosphere to form the $\Delta^4$ and $\Delta^{4,6}$ analogues of compounds having the following structural formula

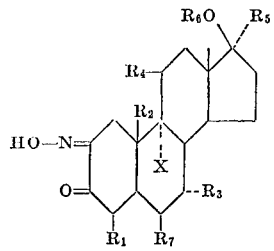

wherein $R_1$, $R_2$, $R_3$, $R_4$, $R_5$, $R_6$, $R_7$ and X are as defined above.

3. 2-oximino-17β-hydroxy-17α-methyl-androst-4-ene-3-one.

4. 2-oximino-11β,17β-dihydroxy-9α-fluoro-17α-methyl-androsta-4-ene-3-one.

5. 2 - oximino-17α-ethyl-17β-hydroxy-19-nor-androst-4-ene-3-one.

6. 2 - oximino-7α,17α-dimethyl-17β-hydroxy-19-nor-androsta-3-one.

7. 2 - oximino-17α-ethyl-17β-hydroxy-7α-methyl - androst-4-ene-3-one.

8. 2 - oximino-17β-hydroxy-androst-4-ene-3-one-17β-phenyl-propionate.

9. 2 - oximino-17β-hydroxy-17α-ethynyl-19-nor-androst-4-ene-3-one.

10. 2 - oximino-4-chloro-17β-hydroxy-17α-methyl-androst-4-ene-3-one.

11. 2 - oximino-4-chloro-17β-hydroxy-17α-methyl-19-nor-androst-4-ene-3-one.

12. 2 - oximino-4,17β-dihydroxy-17α-methyl-androst-4-ene-3-one.

13. 2 - oximino-4,17β-dihydroxy-17α-methyl-19-nor-androst-4-ene-3-one.

14. 2 - oximino - 17β - hydroxy - 7α - methyl - androst-4-ene-3-one.

No references cited.

HENRY A. FRENCH, Primary Examiner

U.S. Cl. X.R.

260—397.45, 999